United States Patent [19]

Bluhm

[11] Patent Number: 4,547,940
[45] Date of Patent: Oct. 22, 1985

[54] TRANSPORT ROLLER ASSEMBLY

[75] Inventor: Dieter H. Bluhm, Charlotte, N.C.

[73] Assignee: American Barmag Corporation, Charlotte, N.C.

[21] Appl. No.: 506,621

[22] Filed: Jun. 22, 1983

[51] Int. Cl.$^4$ .............................................. B21B 31/00
[52] U.S. Cl. ................................... 29/113 R; 29/117; 29/129
[58] Field of Search ................... 29/113, 113 AD, 117, 29/123, 129

[56] References Cited

U.S. PATENT DOCUMENTS

| | | |
|---|---|---|
| 1,154,731 | 9/1915 | Saunders . |
| 2,262,325 | 11/1941 | Kendall . |
| 2,263,439 | 11/1941 | Hansen . |
| 2,964,834 | 12/1960 | Edwards . |
| 3,315,859 | 4/1967 | Owen, Jr. et al. . |
| 3,342,389 | 9/1967 | Drexler . |
| 3,649,036 | 3/1972 | Harz . |
| 3,649,985 | 3/1972 | Hunt . |
| 3,831,874 | 8/1974 | Andrew et al. . |
| 3,994,380 | 11/1976 | Hope et al. . |
| 4,028,783 | 6/1977 | Buck . |
| 4,181,217 | 1/1980 | Huls et al. . |

FOREIGN PATENT DOCUMENTS 453644 12/1948 Canada ................................ 29/117

Primary Examiner—Howard N. Goldberg
Assistant Examiner—Timothy V. Eley
Attorney, Agent, or Firm—Bell, Seltzer, Park & Gibson

[57] ABSTRACT

A transport roller assembly is disclosed which is adapted for use as a yarn delivery roller in a yarn false twisting machine, and which is designed to minimize the time and expense of its replacement upon being damaged. The assembly comprises a spool-like support member which is adapted to be coaxially positioned on a supporting shaft, and an outer sleeve which is adapted to be coaxially positioned on the support member. The support member includes two end flanges and an integral wall joining the flanges, and a number of threaded members extend between the flanges so that rotation of the threaded members results in the flanges deflecting either toward or away from each other. During such deflection, the outer edges of the flanges clampingly engage the bore of the sleeve, and the inner edges clampingly engage the supporting shaft.

9 Claims, 5 Drawing Figures

U.S. Patent  Oct. 22, 1985  Sheet 1 of 2  4,547,940
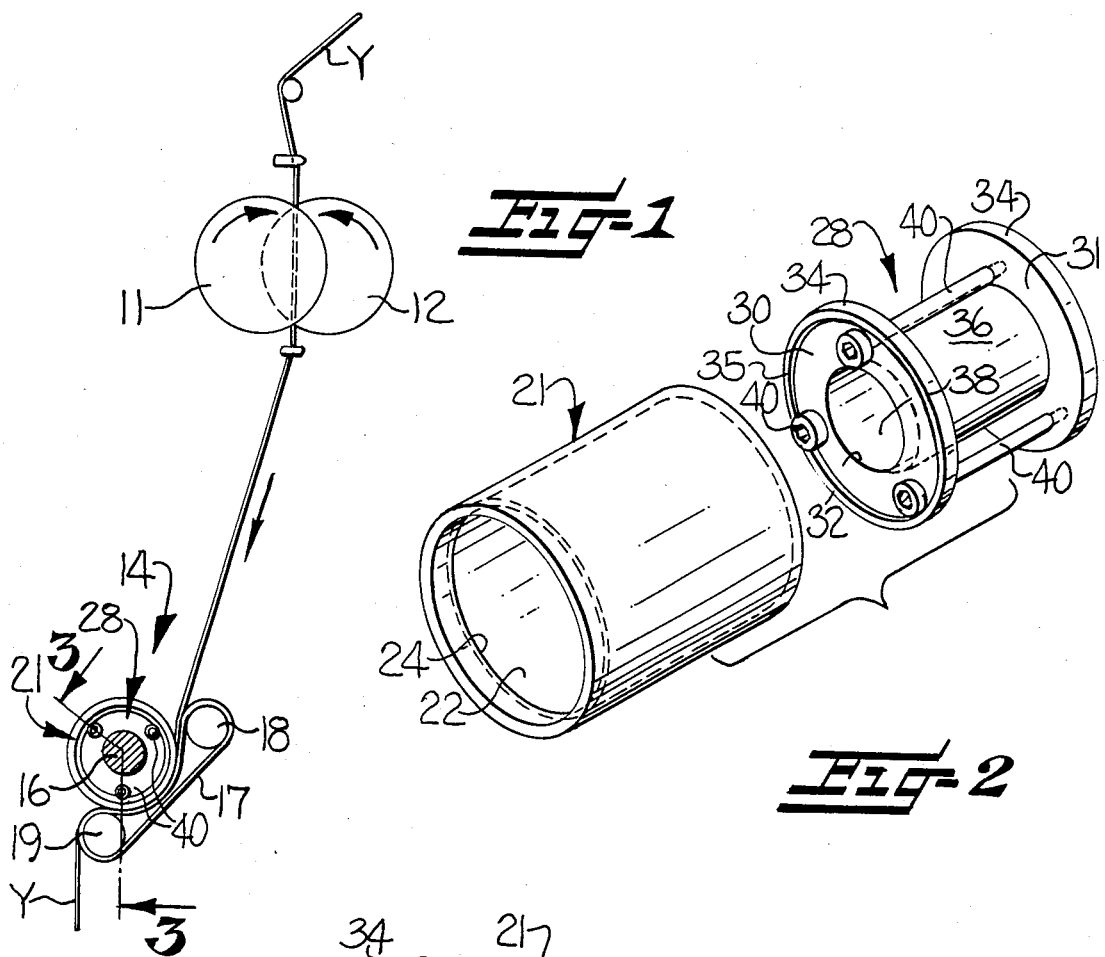
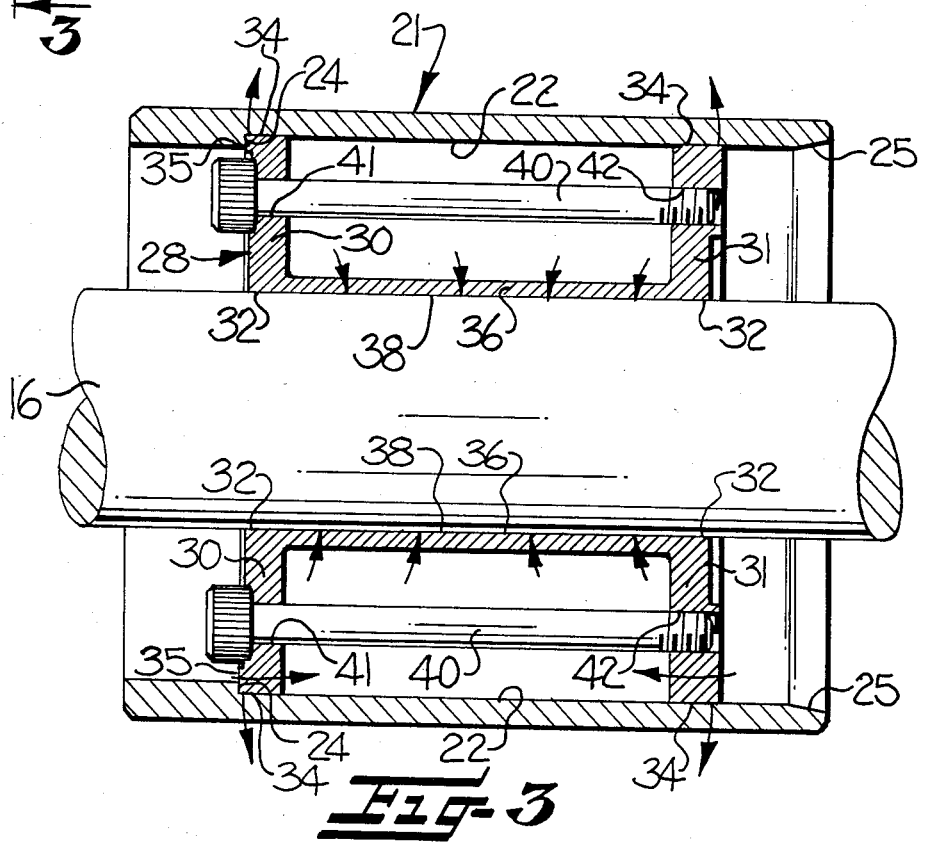

TRANSPORT ROLLER ASSEMBLY

BACKGROUND OF THE INVENTION

The present invention relates to a transport roller assembly adapted to be releaseably fixed on a supporting shaft, and which is adapted for use as a yarn delivery roller in a yarn false twisting machine or the like.

Yarn false twisting machines typically comprise a number of twisting stations wherein a running yarn is subjected to simultaneous twisting, heat setting, cooling, and untwisting operations, and which results in the twist being permanently set in the yarn. The twisting apparatus of each station commonly comprises twist imparting members having cooperating friction surfaces, such as a pair of rotating discs as described in U.S. Pat. No. 4,339,915. Also, a number of yarn feed rollers are commonly associated with the twist imparting apparatus, and typically, each of the feed rollers comprises a one piece steel or aluminum roller which is fixed to a drive shaft by set screws. The yarn is positioned to engage the outer drive surface of each roller, and upon rotation of the drive shaft and roller, the yarn is advanced at a speed on the order of about 900 meters per minute.

By reason of their high rotational speed, yarn delivery rollers of the described type are susceptible to damage, such as when a foreign object contacts and chips the surface of the rotating roller. Thus the rollers must be frequently replaced, and with existing one piece rollers, the entire roller must be removed and replaced. This is not only a time consuming operation, but in addition, the rollers are quite expensive.

It is accordingly an object of the present invention to provide a transport roller assembly which is adapted for use as the yarn delivery roller on a false twisting machine, and which reduces the time and expense of replacing the roller upon its surface being damaged.

It is a more particular object of the present invention to provide a transport roller assembly which is composed of two components, and wherein only the outer component is replaced upon its surface being damaged, and wherein a single mounting operation acts to both secure the two components together and secure the assembly to its supporting shaft.

SUMMARY OF THE INVENTION

These and other objects and advantages of the present invention are achieved in the embodiment illustrated herein by the provision of a transport roller assembly which comprises a cylindrical sleeve having a coaxial central bore, and separate support means for releaseably fixing the sleeve coaxially on a mounting shaft. The support means includes at least one flange having a central opening defining a circular inner edge which is adapted to be closely received on the shaft and a circular outer edge which is adapted to be closely received in the bore of the sleeve. The support means further includes means for deflecting the flange so that at least a portion of the outer edge moves radially outwardly and at least a portion of the inner edge moves radially inwardly. Thus in use, the support means is coaxially positioned on the supporting shaft, and the sleeve is coaxially positioned over the support means. The deflecting means may then be moved for deflecting the flange to cause the outer edge to clampingly engage the bore of the sleeve and to cause the inner edge to clampingly engage the supporting shaft.

In a preferred embodiment, the support means comprises a pair of axially spaced apart flanges, an integral tubular wall disposed axially between the flanges, and threaded members disposed between the flanges for oppositely deflecting the flanges upon rotation thereof. When the support means and sleeve are coaxially mounted on the supporting shaft, the threaded members may be rotated to axially deflect the flanges in opposite directions, and so that the flanges each assume a slightly conical configuration with each outer edge clampingly engaging the bore of the sleeve and each inner edge clampingly engaging the supporting shaft.

Upon the surface of the sleeve being chipped or otherwise damaged, the sleeve may be readily replaced by simply loosening the threaded members and withdrawing the damaged sleeve and replacing it with a new sleeve. The support means usually will not need to be replaced, thus greatly reducing the time and cost of the replacement as compared to the replacement of the present one piece rollers.

BRIEF DESCRIPTION OF THE DRAWINGS

Some of the objects having been stated, other objects and advantages of the present invention will become apparent as the description proceeds, when taken in connection with the accompanying drawings, in which FIG. 1 is a schematic side elevation view of a portion of a yarn false twisting apparatus and which includes a yarn delivery roller which embodies the features of the present invention;

FIG. 2 is an exploded perspective view of the yarn delivery roller shown in FIG. 1;

FIG. 3 is a sectional view of the yarn delivery roller taken substantially along the line 3—3 of FIG. 1;

DESCRIPTION OF THE PREFERRED EMBODIMENTS

Figure 4:
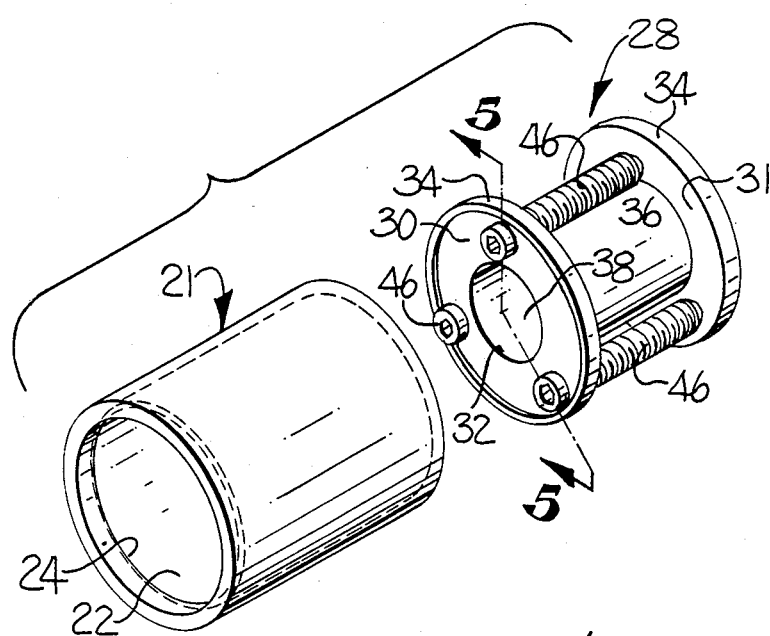
FIG. 4 is a view similar to FIG. 2, but illustrating a second embodiment of the invention.

Referring more specifically to the drawings, FIG. 1 illustrates a portion of a yarn false twisting machine, and which includes a pair of rotating discs 11, 12 which are adapted to impart twist to a running yarn Y, in the manner further described in U.S. Pat. No. 4,339,915. A yarn delivery roller assembly 14 is mounted downstream of the discs, and embodies the features of the present invention. The assembly 14 is mounted on a supporting shaft 16, which is rotated at a relatively high speed, and the assembly cooperates with an endless belt 17 which is mounted so as to contact the surface of the assembly and rotate about its supporting pulleys 18, 19. The advancing yarn Y is threaded between the surface of the assembly 14 and the belt 17 so as to be advanced thereby.

The delivery roller assembly 14 includes a relatively thin cylindrical outer sleeve 21 formed of a suitable material such as steel. The sleeve has a coaxial central bore 22, and the bore 22 includes an inwardly facing radial shoulder 24 adjacent one end thereof. The opposite end of the bore includes a tapered portion 25 to facilitate assembly of the components in a manner to become apparent.

The assembly further includes a spool-like support member 28 for releasably fixing the sleeve 21 coaxially on the supporting shaft 16. The support member 28 includes a pair of axially spaced apart annular flanges 30, 31, with each flange having a central opening defining a circular inner edge 32 which is adapted to be closely received on the supporting shaft, and a circular outer edge 34 which is adapted to be closely received in the bore 22 of the sleeve. An annular rim 35 is formed at the outer edge of the flange 30, with the rim of the flange extending axially outwardly. A wall in the form of a cylindrical tube 36 is disposed axially between the flanges 30, 31 adjacent the inner edges 32. The tube 36 and flanges 30, 31 are of an integral, one piece construction, and may be formed from a suitable material, such as steel, by machining a block of the material into the illustrated spool-like configuration. Also, the cylindrical tube 36 is relatively thin, and the inner surface thereof is radially coincident with the circular inner edges 32 of the flanges, so that the support member defines a smooth, continuous inner bore 38.

The support member 28 further includes three threaded bolts 40 which are disposed axially between the flanges. More particularly, the flange 30 includes three equally spaced apart axial openings 41 adjacent the outer edges thereof, and the flange 31 includes three threaded openings 42 which are axially aligned with respective ones of the openings 41 in the flange 30. A threaded bolt 40 extends through each of the openings 41, and threadedly engages the associated opening 42, whereby rotation of the bolts in a predetermined direction acts to deflect the outer edge portions of the flanges toward each other.

To specifically describe representative dimensions of the embodiment of the assembly illustrated in FIGS. 1-3, the sleeve 21 has an overall axial length of about 92 mm, and the length between the left end of the sleeve and the shoulder 24 as seen in FIG. 3 is about 18.5 mm. The diameter of the bore 22 to the left of the shoulder 24 is about 68 mm, the diameter to the right of the shoulder is about 69 mm, and the outer diameter of the sleeve is about 75 mm. The outer surface of the sleeve is preferably chrome plated to improve wear resistance.

The support member 28 has an axial length of about 55 mm, and each of the flanges 30, 31 has an axial thickness of about 5 mm. The rim 35 on each flange has an axial length of about 4 mm, the diameter of the bore 38 is about 30 mm, and the diameter of the outer edges of the flanges 30, 31 is about 69 mm. The radial thickness of the tube 36 is about 1.5 mm. The diameter of the bore 38 should be between about 0.03 to 0.06 mm greater than the diameter of the shaft 16, and the diameter of the bore 22 of the sleeve should be greater than the diameter of the outer edges 34 of the flanges by about the same amount. As will be apparent, the above dimensions are illustrative only, and other dimensions for the assembly may be selected in accordance with the intended use.

The manner in which the assembly may be fixedly mounted on the supporting shaft 16 will now be described. Initially, the support member 28 is coaxially positioned on the shaft 16, and the sleeve 21 is slipped coaxially over the support member 28 so that the flange 30 abuts the shoulder 24, to thereby automatically center the sleeve on the support member. The three bolts 40 are then rotated so that the outer edges of the flanges 30, 31 deflect axially toward each other, while the inner edges are maintained at a fixed axial separation. The flanges thereby each assume a slightly conical configuration, with the outside portion of each outer edge being moved radially outwardly to clampingly engage the bore 22 of the sleeve. The annular rim 35 on the flange 30 serves to provide a relatively broad area of contact between the flange and bore 22, without unduly increasing the thickness of such flange. The rim has also been found to expand from heat at about the same rate as the sleeve, to thereby maintain a secure interconnection therebetween in the event the outer sleeve is heated.

The deflection of the flanges 30, 31 also causes the inside portions of each inner edge 32 of each flange to move radially inwardly and thereby clampingly engage the supporting shaft 16. Such action also serves to deflect the adjacent portions of the tube 36 of the support member into firm engagement with the shaft 16, in the manner indicated by the arrows in FIG. 3. As will be apparent, the tightening of the bolts 40 acts to both secure the sleeve 21 on the support member 28, and to also secure the support member 28 to the shaft 16.

To release the assembly, the bolts 40 are rotated to permit the flanges to deflect back to their normal position, thereby permitting the sleeve 21 to be slipped from the support member 28. As noted above, the support member 28 will not normally be removed from the shaft 16, although it may be removed if desired.

Figure 5:
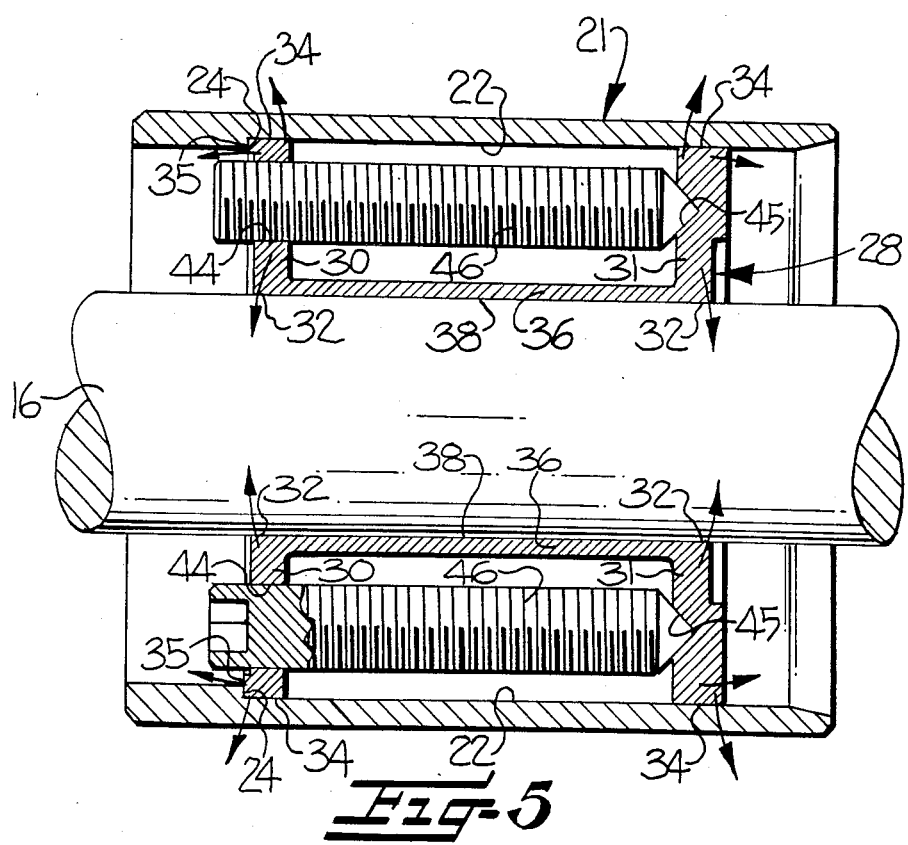
FIG. 5 is a view similar to FIG. 3, but illustrating the second embodiment.

FIGS. 4 and 5 disclose a second embodiment of the invention, with like numerals indicating features which are common with the embodiment of FIGS. 2 and 3. In the embodiment of FIGS. 4 and 5, the flange 30 includes three equally spaced internally threaded axial openings 44, and the other flange 31 includes a conical indentation 45 which is axially aligned with each of the openings. A threaded member 46 is threadedly received in each opening 44, and each member 46 includes a conical tip which is adapted to seat within the indentation 45 in the opposite flange. In this embodiment, rotation of the threaded members 46 in a direction to cause movement toward the right as seen in FIG. 5, results in the flanges 30, 31 being deflected away from each other. This deflection results in a slightly conical configuration as described above, with the outer edges clampingly engaging the bore of the sleeve and the inner edges clampingly engaging the supporting shaft.

In the drawings and specification, there has been set forth preferred embodiments of the invention, and although specific terms are employed, they are used in a generic and descriptive sense only and not for purposes of limitation.

That which is claimed is:

1. A transport roller assembly adapted to be releaseably fixed on a supporting shaft, and which is adapted for use as a yarn delivery roller in a false twisting machine or the like, and comprising a cylindrical sleeve having a coaxial central bore,
support means for releaseably fixing said sleeve coaxially on a supporting shaft, and including a pair of axially spaced apart flange means, at least one of said flange means comprising a relatively thin annular flange having a central opening defining an inner edge which is adapted to be closely received on the supporting shaft and an outer edge adapted to be closely received in the bore of said sleeve, wall means disposed axially between and contacting said pair of flange means for maintaining the adjacent portions of said flange means at a fixed axial separation, and manually movable deflecting means operatively engaging said pair of flange means for deflecting at least said flange of said flange means into a slightly conical configuration and so that at least a portion of said outer edge moves radially outwardly and at least a portion of said inner edge moves radially inwardly, whereby when the support means is coaxially positioned on a supporting shaft and the sleeve is coaxially positioned over the support means, said deflecting means may be moved for deflecting at least said flange to cause the outer edge thereof to clampingly engage the bore of the sleeve and to cause the inner edge thereof to clampingly engage the supporting shaft.

2. The transport roller assembly as defined in claim 1 wherein said deflecting means deflects the flange so that the outer edge and inner edge also move axially relative to each other.

3. A transport roller assembly adapted to be releaseably fixed on a supporting shaft, and which is adapted for use as a yarn delivery roller in a false twisting machine or the like, and comprising a cylindrical sleeve having a coaxial central bore, support means for releaseably fixing said sleeve coaxially on a supporting shaft, and including a pair of axially spaced apart flanges, with eeach flange having a central opening defining a circular inner edge which is adapted to be closely received on the supporting shaft and a circular outer edge adapted to be closely received in the bore of said sleeve, wall means disposed axially between and contacting said flanges for maintaining the adjacent portions of said flanges at a fixed axial separation, and threaded means disposed between said flanges for oppositely deflecting the flanges upon rotation thereof, and so that at least a portion of each outer edge moves radially outwardly and at least a portion of each inner edge moves radially inwardly, whereby when the support means is coaxially positioned on the supporting shaft and the sleeve is coaxially positioned over the support means, rotation of said threaded means results in an axial deflection of the portion of the flanges remote from said wall means to cause each outer edge to clampingly engage the bore of the sleeve and each inner edge to clampingly engage the supporting shaft.

4. The transport roller assembly as defined in claim 3 wherein said wall means includes a cylindrical tube disposed adjacent said central openings, with the inner surface of said tube being radially coincident with said circular inner edges of said flanges.

5. The transport roller assembly as defined in claim 4 wherein said flanges and said cylindrical tube are integrally formed, and said tube is sufficiently thin so as to be deflected upon deflection of said flanges.

6. The transport roller assembly as defined in claim 5 wherein said threaded means includes a plurality of axially aligned openings extending through said flanges adjacent the outer edges thereof, and a threaded member extending through each aligned pair of openings, and whereby the threaded members are adapted to deflect the outer edge portions of the flanges toward each other.

7. The transport roller assembly as defined in claim 5 wherein said threaded means includes a plurality of internally threaded openings extending axially through one of said flanges, and an externally threaded member threadedly received in each of said openings and adapted to engage the other of said flanges, whereby rotation of the threaded members in a selected direction will result in the threaded members deflecting the flanges away from each other.

8. The transport roller assembly as defined in claim 6 or 7 wherein said sleeve includes an annular shoulder in the bore thereof, with the shoulder being adapted to engage one of the flanges of said support means to facilitate the centering of the sleeve on the support means.

9. The transport roller assembly as defined in claim 6 or 7 wherein said outer edge of at least one of said flanges includes an integral annular rim which extends axially from the remaining portion of the associated flange, and so that the rim defines a relatively broad surface for engaging the bore of the sleeve while permitting the flange to remain relatively thin.

* * * * *